(12) United States Patent
Lai

(10) Patent No.: US 6,220,280 B1
(45) Date of Patent: Apr. 24, 2001

(54) PILOT OPERATED RELIEF VALVE WITH SYSTEM ISOLATING PILOT VALVE FROM PROCESS MEDIA

(75) Inventor: Ying-San Lai, North Royalton, OH (US)

(73) Assignee: Curtis-Wright Flow Control Corporation, Lyndhurst, NJ (US)

( * ) Notice: Subject to any disclaimer, the term of this patent is extended or adjusted under 35 U.S.C. 154(b) by 0 days.

(21) Appl. No.: 09/310,549

(22) Filed: May 12, 1999

(51) Int. Cl.[7] .................................................. F16K 31/124
(52) U.S. Cl. ........................ 137/488; 137/489; 137/492.5
(58) Field of Search ................................. 137/489, 489.5, 137/492, 492.5, 488

(56) References Cited

U.S. PATENT DOCUMENTS

| | | |
|---|---|---|
| 3,403,699 | 10/1968 | Fites . |
| 3,512,560 | 5/1970 | Weise . |
| 3,848,630 | 11/1974 | Weise . |
| 4,425,938 | 1/1984 | Papa et al. . |
| 4,442,860 | 4/1984 | Taylor . |
| 4,445,531 | 5/1984 | Powell . |
| 4,559,970 | 12/1985 | Taylor et al. . |
| 4,586,533 | 5/1986 | Estes . |
| 4,664,151 | 5/1987 | Piet . |
| 4,768,539 | 9/1988 | Pringle . |
| 4,848,397 | 7/1989 | Bickford et al. . |
| 5,016,665 | * 5/1991 | Konieczynski .................... 137/489.5 |
| 5,027,852 | 7/1991 | McNeely . |
| 5,213,133 | 5/1993 | Ellett . |
| 5,590,684 | 1/1997 | Alberts et al. . |
| 5,725,015 | 3/1998 | Theodos et al. . |
| 5,738,333 | 4/1998 | Cognevich et al. . |

* cited by examiner

Primary Examiner—Gregory L. Huson
Assistant Examiner—Ramesh Krishnamurthy
(74) Attorney, Agent, or Firm—Pearne & Gordon LLP

(57) ABSTRACT

A pressure relief system includes a relief valve for selectively discharging process media from a pressure vessel, a pilot valve for controlling the relief valve, and an isolation system for isolating the pilot valve from the process media. The pilot valve has an inlet port, a control port in communication with a dome chamber of the relief valve, and a discharge port. The isolation system includes an accumulator such as a piston-type or bladder-type accumulator, a source of pressurized control fluid, a pressure regulator, and a check valve. The accumulator has an interior chamber with an inlet in communication with an inlet of the relief valve and an outlet in communication with the inlet port of the pilot valve. An isolator such as a piston or bladder divides the interior chamber into a first portion and a second portion and prevents flow therebetween to isolate process media (located in the first portion) from control fluid (located in the second portion). The isolator is movable in response to fluid pressure in the first and second portions to transmit pressure changes of process media in the first portion to control fluid in the second portion. The source of pressurized control fluid is in communication with both the accumulator outlet and the pilot valve inlet port so that the control fluid does not drop below a predetermined pressure level. The pressure regulator is located between the source of pressurized control fluid and both the accumulator outlet and the pilot valve inlet port. The check valve is located between the pressure regulator and both the accumulator outlet and the pilot valve inlet port.

34 Claims, 3 Drawing Sheets

PILOT OPERATED RELIEF VALVE WITH SYSTEM ISOLATING PILOT VALVE FROM PROCESS MEDIA

BACKGROUND OF THE INVENTION

The present invention generally relates to a pressure relief valve controlled by a pilot valve, and more particularly, to an isolation system for isolating the pilot valve from process media or fluid.

A pressure relief system typically includes a relief valve mounted over a pressure vessel, such as a tank or pipe line, and a pilot valve which controls movement of the relief valve. The relief valve moves to an open position when pressure in the pressure vessel reaches a predetermined maximum level to discharge process media or fluid from the pressure vessel and reduce pressure therein. The relief valve moves to a closed position when enough process media is discharged to reduce the pressure in the pressure vessel to a desired predetermined level.

The pilot valve is typically of a non-flow type wherein process media does not flow through the pilot valve when the relief valve is in a static condition but process media does flow through the pilot valve to move or operate the relief valve. For example, see U.S. Pat. No. 3,664,362, disclosing a non-flow pilot valve, the disclosure of which is expressly incorporated herein by reference in its entirety. Process media flows through the pilot valve and changes a dome pressure of the relief valve to activate a pressure responsive element, such as a piston or diaphragm.

These pilot valves serve their intended purpose in an exemplary manner when the process media is clean. These pilot valves, however, are not suitable for dirty service wherein the process media is dirty and/or contains particulate or foreign matter because the pilot valves have many tight clearances which can be affected thereby. For example, flow passages can be clogged or restricted, sliding surfaces can be damaged and/or bound together, and sealing surfaces can be damaged and/or held apart.

One solution has been to supply an auxiliary source of clean fluid to the dome chamber of the relief valve and chambers of the pilot valve which expose a spool valve so that the process media does not contaminate the dome chamber or the spool valve. See, for example, U.S. Pat. No. 5,027,852, the disclosure of which is expressly incorporated herein in its entirety by reference. This solution, however, still exposes some components of the pilot valve to process media and cannot be used to retrofit existing pressure relief systems without replacing the existing pilot valve. Accordingly, there is a need in the art for an improved pressure relief system wherein a pilot valve is isolated from process media.

SUMMARY OF THE INVENTION

The present invention provides a pilot operated pressure relief system which overcomes the above-described problems of the related art. According to the present invention, the pressure relief system includes a relief valve, a pilot valve, and an accumulator for transmitting pressure changes of process media in a pressure vessel to control fluid in the pilot valve. The relief valve has an inlet in fluid-flow communication with the pressure vessel, an outlet, and a dome chamber. The pilot valve has an inlet port, a control port in fluid-flow communication with the dome chamber, and a discharge port. The accumulator has an inlet in fluid-flow communication with the inlet of the relief valve, an outlet in fluid flow communication with the inlet port of the pilot valve, and an isolator preventing fluid-flow communication between the accumulator inlet and the accumulator outlet to isolate control fluid from process media.

In a preferred embodiment, the accumulator is a piston-type accumulator wherein the isolator is a piston movable within an interior chamber. Alternatively, a bladder-type accumulator can be used wherein the isolator is a bladder movable within an interior chamber. The isolator divides the interior chamber into a first portion in fluid-flow communication with the accumulator inlet and a second portion in fluid-flow communication with the accumulator outlet and is movable in response to fluid pressure in the first and second portions of the interior chamber. Preferably, the pressure relief system further includes a source of pressurized control fluid which is in fluid-flow communication with both the outlet of the accumulator and the inlet port of the pilot valve to prevent the control fluid from dropping below a predetermined pressure level.

BRIEF DESCRIPTION OF THE SEVERAL VIEWS OF THE DRAWING

These and further features of the present invention will be apparent with reference to the following description and drawings, wherein.

DETAILED DESCRIPTION OF PREFERRED EMBODIMENTS

Figure 1:
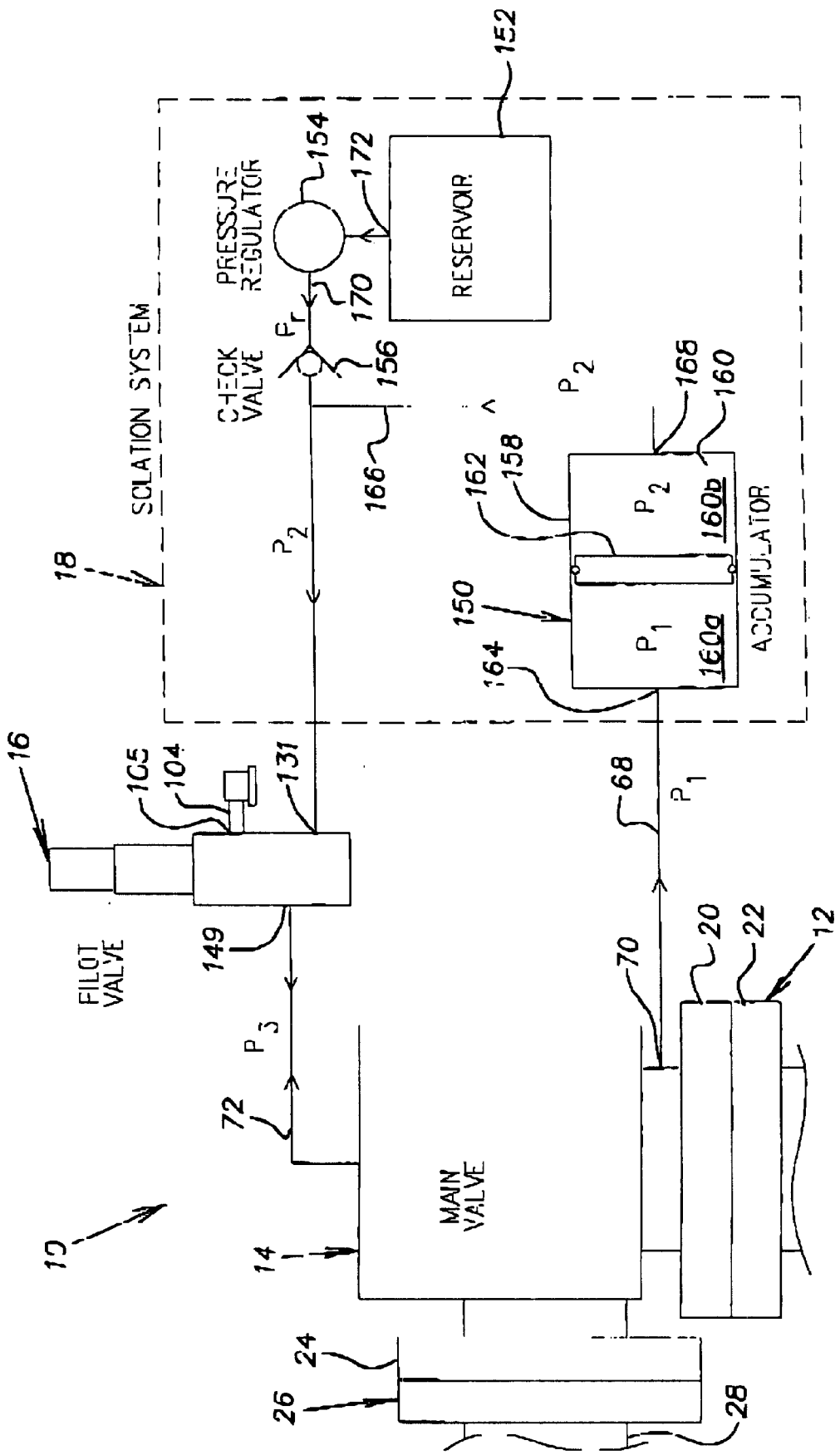
FIG. 1 is a schematic view of a pressure relief system having a relief valve, a pilot valve, and an isolation system according to the present invention.

FIG. 1 illustrates a safety or pressure relief system 10 according to the present invention for use with a pressure vessel 12, such as a tank or pipe line, containing process media such as, for example a fluid. The pressure relief system 10 includes a control or relief valve 14 for maintaining a desired pressure in the pressure vessel 12, a pilot valve 16 for operating the relief valve 14, and an isolation system 18 for isolating the pilot valve 16 from process media within the pressure vessel 12.

Figure 2A:
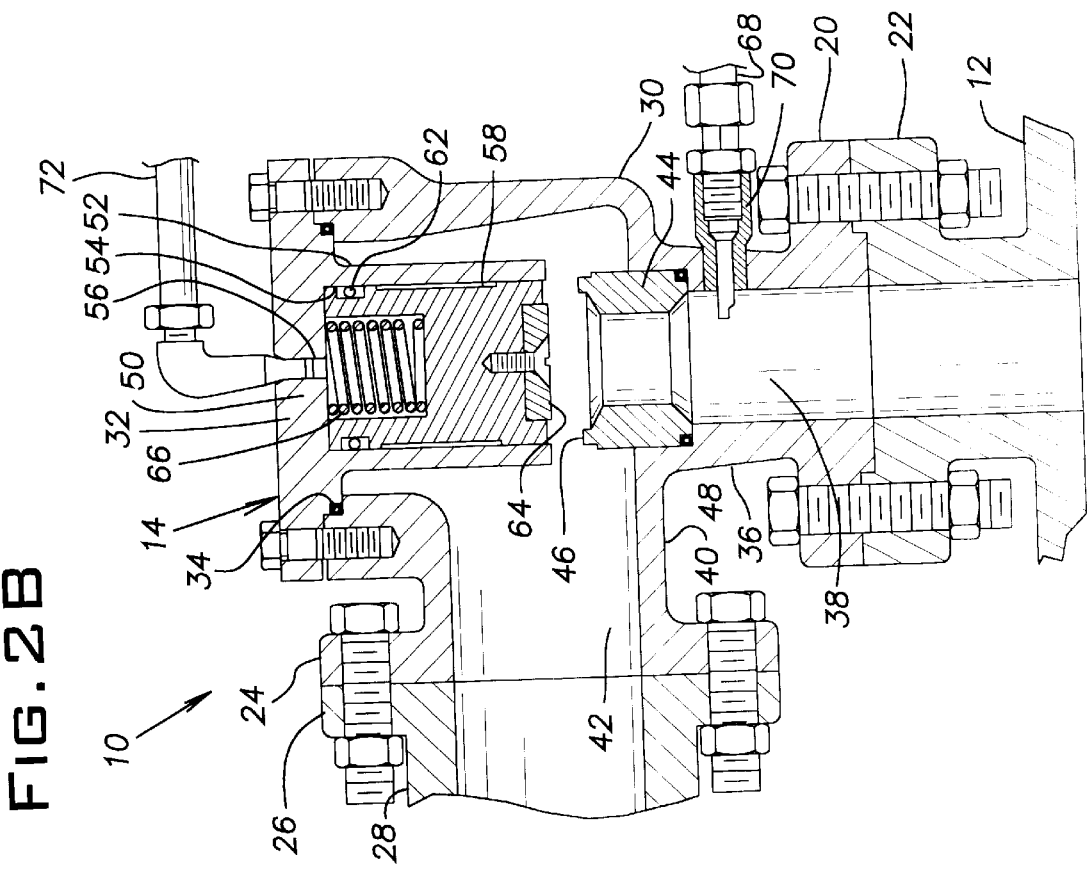
FIG. 2A is an elevational view, in partial cross-section, of the relief valve of FIG. 1 in a normal closed position.

As best shown in FIG. 2A, the relief valve 14 has an inlet or lower flange 20 sealingly connected to an outlet or upper flange 22 of the pressure vessel 12 by suitable nut and bolt combinations. The relief valve 14 also has an outlet or side flange 24 sealingly connected to a flange 26 of a discharge pipe or line 28 by suitable nut and bolt connections.

The relief valve 14 of the illustrated embodiment has a body 30 with a cap or cover 32 secured thereon by threaded bolts with a suitable seal 34 provided therebetween. The relief-valve body 30 has an inlet 36 defining a flow passage at the lower flange 20. The inlet 36 is in fluid-flow communication at all times with an inlet chamber 38 formed within the relief-valve body 30. The relief-valve body 30 also has an outlet 40 defining a flow passage at the side flange 24. The outlet 40 is in fluid-flow communication at all times with an outlet chamber 42. A nozzle element 44 is secured to the relief-valve body 30 at the inlet chamber 38 with an inlet end facing the inlet chamber 38 and an outlet facing the outlet chamber 42. The outlet end of the nozzle element 44 is preferably provided with an annular-shaped valve seat 46. A suitable seal 48 is provided between the nozzle element 44 and the relief-valve body 30.

The relief-valve cover 32 includes a wall portion 50 and an annularly-shaped sleeve portion 52 perpendicularly extending from the wall portion 50 into the outlet chamber 42. The sleeve portion 52 defines a cylindrically-shaped bore 54 therein. One end of the bore 54 is open and faces the outlet end of the nozzle element 44 and the other end is closed except for a dome port 56 extending through the wall portion 50. A piston 58 is mounted for reciprocal movement within the bore 54. The piston 58 has a hollow end facing the wall portion 50 which cooperates with the relief-valve cover 32 to form a dome chamber 60. Suitable seals 62 are mounted in annular grooves about the piston 58 and ride in sealing relationship with the bore 54 as the piston 58 moves within the bore 54. An end of the piston 58 facing the nozzle element 44 is provided with a seal or valve element 64 arranged to seal the nozzle element 44 when engaging the valve seat 46. The valve element 64 is attached to the piston 58 by any suitable manner such as the illustrated retainer and threaded fastener.

A compression spring 66 is located within the dome chamber 60 between the hollow end of the piston 58 and the wall portion 50 of the relief-valve cover 32. The compression spring 66 biases or urges the piston 58 toward the nozzle element 44 so that the seat seal 64 is in sealing contact with the nozzle seat 46 in a fluid-tight manner so that there is no fluid-flow communication between the inlet chamber 38 and the outlet chamber 42.

An sensing pipe or line 68 extends from the relief valve 14 to the isolation system 18 as described in more detail hereinafter. The sensing line 68 is in fluid-flow communication with the inlet chamber 38 of the relief valve 14 via a pressure pick-up 70 extending into the inlet chamber 38.

A dome pipe or line 72 extends to the relief valve 14 from the pilot valve 16 as described in more detail hereinafter. The dome line 72 is in fluid-flow communication with the dome chamber 60 via the dome port 56 in the relief-valve cover 32. In the illustrated embodiment, a suitable elbow connector is provided.

While the relief valve 14 of the illustrated embodiment has been described in great detail hereinabove, it is noted that the isolation system 18 of the present invention can be utilized with a wide variety of other relief valve configurations. Accordingly, the scope present invention is not limited to relief valves of the illustrated configuration.

Figure 3A:
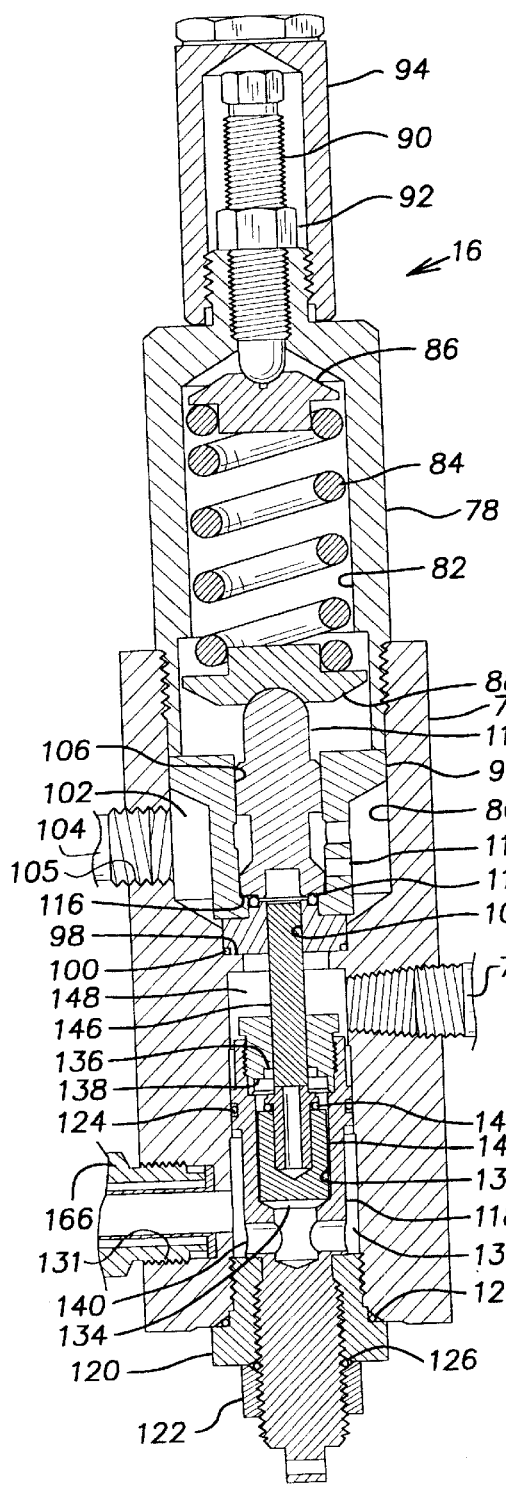
FIG. 3A is an enlarged elevational view, in partial cross-section, of the pilot valve of FIG. 1 in a normal closed position.

As best shown in FIG. 3A, the pilot valve 16 has a body 76 and a bonnet 78, each with a central bore 80, 82 extending therethrough. External threads of the bonnet 78 are secured to internal threads of the pilot-valve body 76. A compression spring 84 is provided within the bore 82 of the bonnet 78 between opposed upper and lower spring followers 86, 88. An adjustment screw 90 is threaded through internal threads of the bonnet 78 and is in engagement with the upper spring follower 86 to adjust compression of the compression spring 84. A lock nut 92 is provided on the adjustment screw 90 to engage the bonnet 78 and secure the adjustment screw 90 in a desired position. A cap 94 is threaded onto external threads at an upper end of the bonnet 78 to cover and protect the adjustment screw 90.

A fixed upper cage or guide member 96 is secured within the bore 80 of the pilot-valve body 76 between a lower end of the bonnet 78 and a lateral face 98 which perpendicularly extends from the bore 80 of the pilot-valve body 76. A suitable seal 100 is provided between the upper guide member 96 and the pilot-valve body 76. An outer surface of the upper guide member 96 is recessed to form a generally annularly-shaped outlet chamber 102 within an upper portion of the body bore 80. A discharge pipe or line 104 of the pilot valve 16 is in fluid-flow communication with the outlet chamber 102 via an outlet port 105 formed in the pilot valve body 80.

The upper guide member 96 includes a cylindrically-shaped bore or valve chamber 106 having an open upper end facing the lower spring follower 88 and a substantially closed lower end except for an opening 108 of reduced size. An upper valve seat 110 is provided encircling the opening 108. The upper guide member 96 also includes radially extending holes or passages 112 for providing fluid communication between the valve-chamber 106 and the outlet chamber 102.

An upper valve element or disc 114 is mounted for reciprocal longitudinal movement within the valve chamber 106. A lower end of the upper disc 114, facing the upper seat 110, forms a valve 116 to seal the opening 108 in a fluid-tight manner when engaging the upper seat 110 of the upper guide member 96. An upper end of the upper disc 114 engages the lower spring follower 88 so that the compression spring 84 biases or urges the upper disc 114 downwardly toward the upper guide member 96 with the valve 116 of the upper disc 114 in sealing contact with the upper seat 110 of the upper guide member 96 to seal the opening 108.

A movable lower cage or guide member 118 is located within a lower portion of the bore 80 of the pilot-valve body 76. The lower guide member 118 is externally threaded into a bushing 120 which in turn is threaded into the lower end of the bore 80. A lock nut 122 is provided on the lower guide member 118 to engage the bushing 120 and secure the lower guide member 118 in an adjusted longitudinal position within the bore 80. A suitable seal 124 is mounted in an annular groove about the lower guide member 118 and is in sealing relationship with the bore 80. Suitable seals 126, 128 are also respectively provided between the lower guide member 118 and the bushing 120, and between the bushing 120 and the pilot-valve body 76. An outer surface of the lower guide member 118 is recessed to form a generally annularly-shaped inlet chamber 130 within a lower portion of the bore 80. The pilot-valve inlet chamber 130 is in fluid-flow communication with the isolation system 18, as described in more detail hereinafter, via an inlet port 131 formed in the pilot-valve body 80.

Formed within the lower guide member 118 is a cylindrically-shaped bore or valve chamber 132 having an inlet 134 at a lower end and an outlet 136 at an upper end. The upper end of the valve chamber 132 is provided with a lower valve seat 138. Radially extending openings or passages 140 are provided in the lower guide member 118 for establishing fluid-flow communication between the inlet chamber 130 and the valve chamber 132. A lower valve element or disc 142 is mounted for reciprocal longitudinal movement within the valve chamber 132 and has a seal 144 at an upper end thereof to seal the outlet 136 when the seal 144 of the lower disc 142 is in contact with the lower seat 138. The lower disc 142 is movable responsive to a pressure differential across the lower disc 142. The lower disc 142 is preferably closely spaced with respect to the wall of the valve chamber 132 to provide a restriction to the flow of fluid through the inlet chamber 132 around the lower disc 142.

A spacer rod 146 extends from the top of the lower disc 142 through the outlet 136 and the upper guide member opening 108 and preferably is closely spaced with respect to both of these annular passages to provide a flow restriction. The spacer rod 146 is sized to allow some relative movement between the upper and lower discs 114, 142 while assuring that both valve members are not seated at the same time.

An intermediate chamber 148 is formed within the bore 80 of the pilot-valve body 76 between the upper guide member 96 and the lower guide member 118. The intermediate chamber 148 is in fluid-flow communication with the inlet chamber 130 when the valve-chamber outlet 136 is not sealed closed by the lower disc 142, and is in fluid-flow communication with the outlet chamber 102 when the upper guide member opening 108 is not sealed by the upper disc 114. The dome line 72 is in fluid-flow communication with the intermediate chamber 148 of the pilot valve 16 via a control port 149 formed in the pilot-valve body 80.

While the pilot valve 16 of the illustrated embodiment has been described in great detail hereinabove, it is noted that the isolation system 18 of the present invention can be utilized with a wide variety of other pilot valve configurations. Accordingly, the scope present invention is not limited to pilot valves of the illustrated configuration.

As best shown in FIG. 1, the isolation system 18 connects the inlet chamber 38 of the relief valve 14 and the inlet chamber 130 of the pilot valve 16 so that process media within the pressure vessel 12 does not enter any part of the pilot valve 16, that is, the pilot valve 16 is completely isolated from process media. The isolation system 18 preferably includes an accumulator 150, a reservoir or source 152 of clean pressurized fluid, a pressure regulator 154, and a one-way or check valve 156.

The accumulator 150 includes a cylinder 158 forming a sealed interior chamber 160 and a piston 162 within the interior chamber 160 to divide the interior chamber 160 into first and second portions 160a, 160b. The piston 162 is sealed to the interior wall of the cylinder 158 and is movable within the interior chamber 160 in response to fluid pressure within the first and second portions 160a, 160b of the interior chamber 160. The accumulator 150 is preferably sized so that an increase in pressure of process media in the first portion 160a results in an equal increase in pressure of control fluid in the second portion 160, that is, the accumulator is sized to have a 1:1 pressure transfer ratio. It is noted that while a piston-type accumulator is shown and described, other types of accumulators can be alternatively utilized such as, for example, a bladder-type accumulator.

The sensing line 68 is connected to an inlet 164 of the cylinder 158 to provide fluid-flow communication between the inlet chamber 38 of the relief valve 14 and the first portion 160a of the cylinder interior chamber 160. An isolation pipe or line 166 connects an outlet 168 of the cylinder 158 and the inlet port 131 of the pilot valve 16 to provide fluid-flow communication between the second portion 160b of the cylinder interior chamber 160 and the inlet chamber 130 of the pilot valve 16.

The reservoir 152 provides a supply of clean, high-pressure control fluid such as, for example, nitrogen. A source pipe or line 170 connects an outlet 172 of the reservoir 152 with the isolation line 166 at an intermediate point along the isolation line 166 between the accumulator 150 and the pilot valve 16.

The pressure regulator 154 is provided along the source line 170 adjacent the reservoir 152. The pressure regulator 154 ensures that a predetermined constant or regulated pressure $P_r$ is provided from the source line 170 to the isolation line 166.

The check valve 156 is provided along the source line 170 between the pressure regulator 154 and the isolation line 166. The check valve 156 ensures that the clean pressurized control fluid only flows out, that is, only flows in one direction from the reservoir 152 to the isolation line 166 and not from the isolation line 166 to the reservoir 152.

As best shown in FIG. 1, process media in the pressure vessel 12 is maintained at a desired pressure during operation of the pressure-relief system 10. Process media in the pressure vessel 12 freely flows into the inlet chamber 38 of the relief valve 14 so that process media in the inlet chamber 38 of the relief valve 14 is at a vessel or system pressure $P_1$. Process media freely passes through the sensing line 68, via the pressure pick-up 70, to the first portion 160a of the accumulator interior chamber 160 so that process media in the first portion 160a of the accumulator interior chamber 160 is also at the system pressure $P_1$.

Clean control fluid within the second portion 160b of the accumulator interior chamber 160 is at a control pressure $P_2$. Control fluid freely passes through the isolation line 166 between the second portion 160b of the accumulator interior chamber 160 and the inlet chamber 130 of the pilot valve 16 so that control fluid in the inlet chamber 130 of the pilot valve 16 is also at the control pressure $P_2$. The reservoir 152, the pressure regulator 154, and the check valve 156 ensure that the control pressure $P_2$ does not drop below the predetermined regulated pressure $P_r$. When the system pressure $P_1$ is at its desired level, the control pressure $P_2$ is preferably equal $P_1$, that is, equal to or greater than the regulated pressure $P_r$.

As best shown in FIG. 3A, the upper disc 114 of the pilot valve 16 is seated on the upper seat 110 to isolate the outlet chamber 102 from the intermediate chamber 148 so that there is no fluid-flow communication between the discharge line 104 and the dome line 72 or the isolation line 166. The force exerted by the pilot-valve compression spring 84 is adjusted to maintain the upper disc 114 on the upper seat 110 at the predetermined level of the control pressure $P_2$, that is, at $P_1$.

There is restricted flow between the inlet chamber 130 and the intermediate chamber 148 of the pilot valve 16 because the lower valve disc 142 is unseated from the lower seat 138. Therefore, there is restricted fluid-flow communication between the isolation line 166 and the dome line 72. Accordingly, dome pressure $P_3$, in the pilot-valve intermediate chamber 148, the dome line 72, and the dome chamber 60, reaches the predetermined level of the control pressure $P_2$ that is, reaches $P_1$.

As best shown in FIG. 2A, a control force provided by clean control fluid in the dome chamber 60 and the relief-valve compression spring 66 acts on the piston 58 to ensure that the piston valve element 64 remains sealingly engaged with the valve seat 46 of the nozzle element 44 to prevent flow of process media from the relief-valve inlet chamber 38 to the relief-valve outlet chamber 42.

As best shown in FIG. 1, an increase in system pressure $P_1$ in the pressure vessel 12 results in an increase in pressure in the first portion 160a of the accumulator interior chamber 160. The increase in system pressure $P_1$ moves the accumulator piston 162 toward the interior chamber second portion 160b to increase the control pressure $P_2$ in the interior chamber second portion 160b, the isolation line 166, and the pilot valve inlet chamber 130.

Figure 3B:
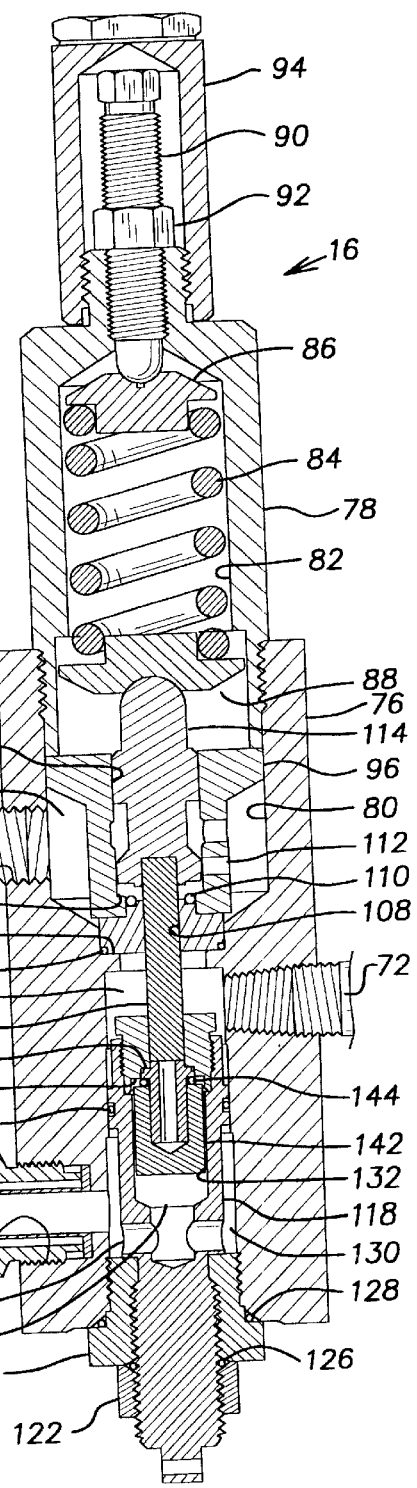
FIG. 3B is an enlarged elevational view, in partial cross-section, of the pilot valve of FIG. 1 in a open or discharging position.

As best shown in FIG. 3B, fluid pressure in the pilot valve intermediate chamber 148 exerts a force on the exposed portion of the upper disc 114 through the opening 108. The force exerted by the pilot-valve compression spring 84 is adjusted to allow the upper disc 114 to lift off the upper seat 110 at a predetermined maximum level or opening pressure.

When clean control fluid in the pilot-valve intermediate chamber 148 reaches the opening pressure, the upper disc 114 rises and is unseated. As the upper disc 114 is unseated, clean control fluid in the intermediate chamber 148 is released to the outlet chamber 102 where the clean control fluid is discharged through the pilot-valve discharge line 104.

Flow past the lower disc 142, urges the lower disc 142 toward the outlet 136 of the valve chamber 132 which exerts an upward force on the upper disc 114 by the spacer rod 146 until the upper disc 114 is in a full open position. When the upper disc 114 is in a full open position, the lower disc 142 engages the lower seat 138 at the top of the valve chamber 132 to prevent flow from the inlet chamber 130 to the intermediate chamber 148, that is, to shut off the supply of clean control fluid from the isolation line 166. The spacer rod 146 maintains the upper disc 114 in an unseated position as long as the lower disc 142 is in a seated position.

Figure 2B:
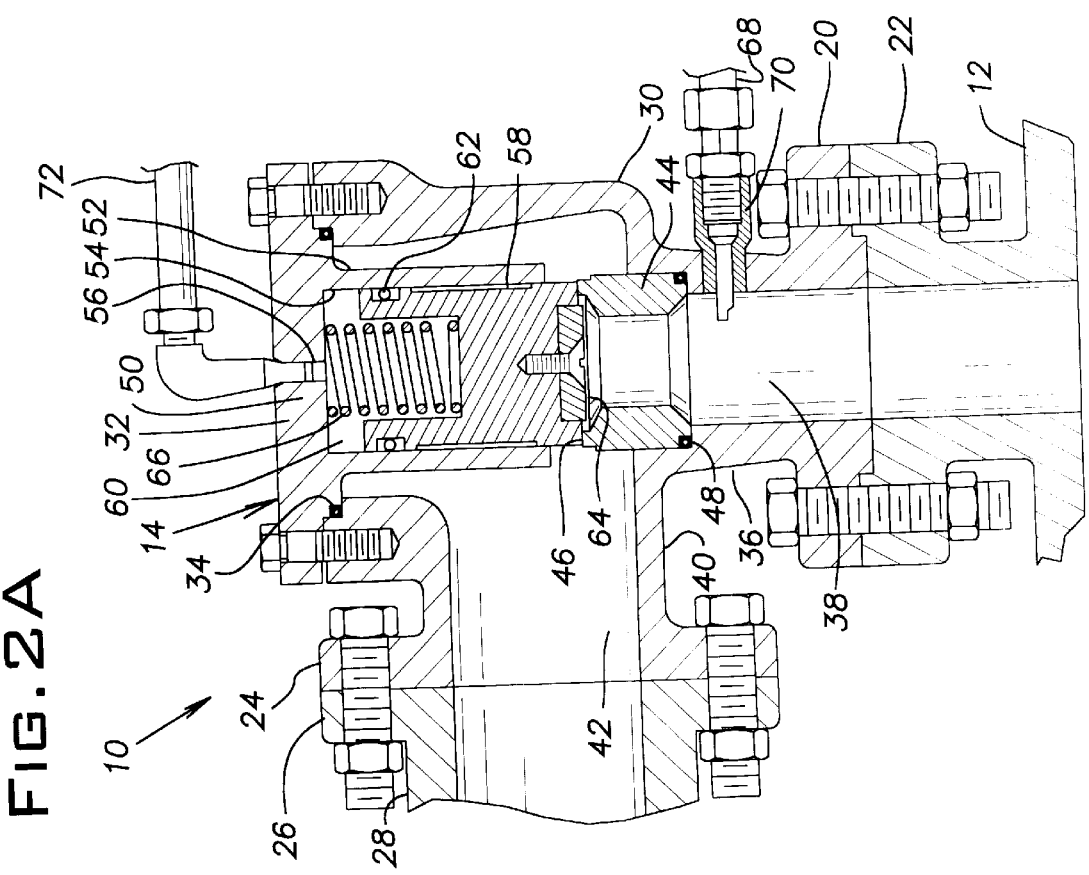
FIG. 2B is an elevational view, in partial cross-section, of the relief valve of FIG. 1 in an open or discharging position.

Fluid-flow communication between the intermediate chamber 148 and the outlet chamber 102 of the pilot valve 16 allows clean control fluid in the dome chamber 60 of the relief valve 14 to vent through the discharge line 104, via the pilot valve 16, resulting in a reduction of the dome pressure $P_3$. As best shown in FIG. 2B, the system pressure $P_1$ in the relief-valve inlet chamber 38 raises the piston 58 to an open or unseated position and thereby allows process media to flow from the relief-valve inlet chamber 38 to the relief-valve outlet chamber 42 and discharge through the discharge line 28.

The reduced system pressure $P_1$ in the pressure vessel 12 moves the accumulator piston 162 toward the interior chamber first portion 160a to lower the control pressure $P_2$. As best shown in FIG. 3A, the pilot valve lower disc 142 is opened and the pilot-valve upper disc 114 is closed at a predetermined closing or blowdown pressure. The opening of the lower disc 142 and the closing of the upper disc 114 is responsive to the pressure force on the lower disc 142 and the spring force exerted by the compression spring 84. The restriction to flow in the areas around the spacer rod 146 causes the lower disc 142 to snap away from the lower seat 138 once it cracks open and also causes the upper disc 114 to snap to the closed position against the upper seat 110. With the pilot valve lower disc 142 in the open position and the pilot valve upper disc 114 in the closed position, the control pressure $P_2$ and the dome pressure $P_3$ are returned to the regulated pressure $P_r$ by the reservoir 152.

The closing or blowdown pressure is preadjusted to close the upper disc 114 before the relief valve 14 closes. The closing pressure is controlled by adjusting the longitudinal position of the lower seat 138 in relation to the upper seat 110.

As best shown in FIG. 2A, the dome pressure $P_3$ and bias of the compression spring 66 returns the piston 58 to a closed or seated position to stop the flow of process media from the relief-valve inlet chamber 38 to the relief-valve outlet chamber 42 when the system pressure $P_1$ has returned to its desired level.

From the above description its is apparent that the pressure relief system 10 according to the present invention completely isolates the pilot valve 16 and the dome chamber 60 from process media so that no parts thereof can be contaminated or damaged by dirty process media. It is also apparent that the isolation system 18 according to the present invention can be used with existing pilot valves and therefore can be used to retrofit existing pressure relief systems without replacing the existing pilot valves.

Although particular embodiments of the invention have been described in detail, it will be understood that the invention is not limited correspondingly in scope, but includes all changes and modifications coming within the spirit and terms of the claims appended hereto.

What is claimed is:

1. A pressure relief system for a pressure vessel containing process media, said pressure relief system comprising:
   a relief valve having an inlet in fluid-flow communication with the pressure vessel, an outlet, and a dome chamber;
   a pilot valve having an inlet port, a control port in fluid-flow communication with the dome chamber, and a discharge port; and
   an accumulator separate from said pilot valve for transmitting pressure changes of process media to control fluid in said pilot valve and said dome chamber, said accumulator having an inlet in fluid-flow communication with said inlet of said relief valve, an outlet in fluid-flow communication with said inlet port of said pilot valve by an isolation line, and an isolator preventing fluid-flow communication between said accumulator inlet and said accumulator outlet to isolate process media from control fluid.

2. The pressure relief system according to claim 1, wherein said accumulator includes a cylinder forming an interior chamber and said isolator is a piston within said interior chamber, said piston divides said interior chamber into a first portion in fluid-flow communication with said accumulator inlet and a second portion in fluid-flow communication with said accumulator outlet, and said piston is movable in response to fluid pressure in said first and second portions of said interior chamber.

3. The pressure relief system according to claim 2, further comprising a source of pressurized control fluid in fluid-flow communication with both said outlet of said accumulator and said inlet port of said pilot valve.

4. The pressure relief system according to claim 1, further comprising a source of pressurized control fluid in fluid-flow communication with both said outlet of said accumulator and said inlet port of said pilot valve.

5. The pressure relief system according to claim 4, further comprising a pressure regulator between said source of pressurized control fluid and both said outlet of said accumulator and said inlet port of said pilot valve.

6. The pressure relief system according to claim 5, further comprising a check valve between said pressure regulator and both said outlet of said accumulator and said inlet port of said pilot valve, and wherein said check valve is oriented to allow flow out of said source of pressurized control fluid through said check valve and to prevent flow into said source of pressurized control fluid through said check valve.

7. The pressure relief system according to claim 4, further comprising a check valve between said source of pressurized control fluid and both said outlet of said accumulator and said inlet port of said pilot valve, and wherein said check valve is oriented to allow flow out of said source of pressurized control fluid through said check valve and to prevent flow into said source of pressurized control fluid through said check valve.

8. An isolation system for a pressure-relief system of a pressure vessel containing process media, said pressure-relief system including a relief valve with an inlet in fluid-flow communication with the pressure vessel and a dome chamber, and a pilot valve with a control port in fluid-flow communication with the dome chamber of the relief valve and an inlet port, said isolation system comprising:

- an accumulator separate from said pilot valve for transmitting pressure changes in process media to control fluid in said pilot valve and said dome chamber, said accumulator having an inlet connectable with said inlet of said relief valve, an outlet connectable with the inlet port of the pilot valve by an isolation line, and an isolator preventing fluid-flow communication between said accumulator inlet and said accumulator outlet to isolate process media from control fluid; and
- a source of pressurized control fluid in fluid-flow communication with said outlet of said accumulator.

9. The isolation system according to claim 8, wherein said accumulator includes a cylinder forming an interior chamber and said isolator is a piston within said interior chamber, said piston divides said interior chamber into a first portion in fluid-flow communication with said accumulator inlet and a second portion in fluid-flow communication with said accumulator outlet, and said piston is movable in response to fluid pressure in said first and second portions of said interior chamber.

10. The isolation system according to claim 9, further comprising a pressure regulator between said source of pressurized control fluid and said outlet of said accumulator.

11. The isolation system according to claim 10, further comprising a check valve between said pressure regulator and said outlet of said accumulator, and wherein said check valve is oriented to allow flow out of said source of pressurized control fluid through said check valve and to prevent flow into said source of pressurized control fluid through said check valve.

12. The isolation system according to claim 9, further comprising a check valve between said source of pressurized control fluid and said outlet of said accumulator, and wherein said check valve is oriented to allow flow out of said source of pressurized control fluid through said check valve and to prevent flow into said source of pressurized control fluid through said check valve.

13. The isolation system according to claim 8, further comprising a pressure regulator between said source of pressurized control fluid and said outlet of said accumulator.

14. The isolation system according to claim 13, further comprising a check valve between said pressure regulator and said outlet of said accumulator, and wherein said check valve is oriented to allow flow out of said source of pressurized control fluid through said check valve and to prevent flow into said source of pressurized control fluid through said check valve.

15. The isolation system according to claim 8, further comprising a check valve between said source of pressurized control fluid and said outlet of said accumulator, and wherein said check valve is oriented to allow flow out of said source of pressurized control fluid through said check valve and to prevent flow into said source of pressurized control fluid through said check valve.

16. A pressure relief system for a pressure vessel containing process media, said pressure relief system comprising:

- a relief valve having an inlet in fluid-flow communication with the pressure vessel, an outlet, and a dome chamber;
- a pilot valve having an inlet port, a control port in fluid-flow communication with the dome chamber, and a discharge port;
- a cylinder separate from said pilot valve having an interior chamber with an inlet in fluid-flow communication with said inlet of said relief valve and an outlet in fluid-flow communication with said inlet port of said pilot valve by an isolation line, and a piston located within said interior chamber and dividing said interior chamber into a first portion in fluid-flow communication with said interior chamber inlet and a second portion in fluid-flow communication with said interior chamber outlet, said piston preventing fluid-flow communication between said interior chamber inlet and said interior chamber outlet to isolate process media in said first portion from control fluid in said second portion, said piston being movable in response to fluid pressure in said first and second portions of said interior chamber to transmit pressure changes in process media in said first portion to control fluid in said second portion;
- a source of pressurized control fluid in fluid-flow communication with both said outlet of said cylinder interior chamber and said inlet port of said pilot valve;
- a pressure regulator located between said source of pressurized control fluid and both said outlet of said accumulator and said inlet port of said pilot valve; and
- a check valve between said pressure regulator and both said outlet of said accumulator and said inlet port of said pilot valve, said check valve being oriented to allow flow out of said source of pressurized control fluid through said check valve and to prevent flow into said source of pressurized control fluid through said check valve.

17. A pressure relief system for a pressure vessel containing process media, said pressure relief system comprising:

- a relief valve having an inlet in fluid-flow communication with the pressure vessel, an outlet, and a dome chamber;
- a pilot valve having an inlet port, a control port in fluid-flow communication with the dome chamber, and a discharge port; and
- an accumulator for transmitting pressure changes of process media to control fluid in said pilot valve and said dome chamber, said accumulator having an inlet in fluid-flow communication with said inlet of said relief valve, an outlet in fluid-flow communication with said inlet port of said pilot valve, and an isolator preventing fluid-flow communication between said accumulator inlet and said accumulator outlet to isolate process media from control fluid, said accumulator being sized to have a 1:1 pressure transfer ratio.

18. The pressure relief system according to claim 17, wherein said accumulator includes a cylinder forming an interior chamber and said isolator is a piston within said interior chamber, said piston divides said interior chamber into a first portion in fluid-flow communication with said accumulator inlet and a said portion in fluid-flow communication with said accumulator outlet, and said piston is movable in response to fluid pressure in said first and second portions of said interior chamber.

19. The pressure relief system according to claim 18, further comprising a source of pressurized control fluid in fluid-flow communication with both said outlet of said accumulator and said inlet port of said pilot valve.

20. The pressure relief system according to claim 17, further comprising a source of pressurized control fluid in fluid-flow communication with both said outlet of said accumulator and said inlet port of said pilot valve.

21. The pressure relief system according to claim 20, further comprising a pressure regulator between said source of pressurized control fluid and both said outlet of said accumulator and said inlet port of said pilot valve.

22. The pressure relief system according to claim 21, further comprising a check valve between said pressure regulator and both said outlet of said accumulator and said inlet port of said pilot valve, and wherein said check valve is oriented to allow flow out of said source of pressurized control fluid through said check valve and to prevent flow into said source of pressurized control fluid through said check valve.

23. The pressure relief system according to claim 20, further comprising a check valve between said source of pressurized control fluid and both said outlet of said accumulator and said inlet port of said pilot valve, and wherein said check valve is oriented to allow flow out of said source of pressurized control fluid through said check valve and to prevent flow into said source of pressurized control fluid through said check valve.

24. The pressure relief system according to claim 20, wherein said accumulator is separate from said pilot valve and said outlet of said accumulator is connected to said inlet port of said pilot valve by an isolation line.

25. An isolation system for a pressure-relief system of a pressure vessel containing process media, said pressure-relief system including a relief valve with an inlet in fluid-flow communication with the pressure vessel and a dome chamber, and a pilot valve with a control port in fluid-flow communication with the dome chamber of the relief valve and an inlet port, said isolation system comprising:

an accumulator for transmitting pressure changes in process media to control fluid in said pilot valve and said dome chamber, said accumulator having an inlet connectable with said inlet of said relief valve, an outlet connectable with the inlet port of the pilot valve, and an isolator preventing fluid-flow communication between said accumulator inlet and said accumulator outlet to isolate process media from control fluid, said accumulator being sized to have a 1:1 pressure ratio; and a source of pressurized control fluid in fluid-flow communication with said outlet of said accumulator.

26. The isolation system according to claim 25, wherein said accumulator includes a cylinder forming an interior chamber and said isolator is a piston within said interior chamber, said piston divides said interior chamber into a first portion in fluid-flow communication with said accumulator inlet and a second portion in fluid-flow communication with said accumulator outlet, and said piston is movable in response to fluid pressure in said first and second portions of said interior chamber.

27. The isolation system according to claim 26, further comprising a pressure regulator between said source of pressurized control fluid and said outlet of said accumulator.

28. The isolation system according to claim 27, further comprising a check valve between said pressure regulator and said outlet of said accumulator, and wherein said check valve is oriented to allow flow out of said source of pressurized control fluid through said check valve and to prevent flow into said source of pressurized control fluid through said check valve.

29. The isolation system according to claim 26, further comprising a check valve between said source of pressurized control fluid and said outlet of said accumulator, and wherein said check valve is oriented to allow flow out of said source of pressurized control fluid through said check valve and to prevent flow into said source of pressurized control fluid through said check valve.

30. The isolation system according to claim 25, further comprising a pressure regulator between said source of pressurized control fluid and said outlet of said accumulator.

31. The isolation system according to claim 30, further comprising a check valve between said pressure regulator and said outlet of said accumulator, and wherein said check valve is oriented to allow flow out of said source of pressurized control fluid through said check valve and to prevent flow into said source of pressurized control fluid through said check valve.

32. The isolation system according to claim 25, further comprising a check valve between said source of pressurized control fluid and said outlet of said accumulator, and wherein said check valve is oriented to allow flow out of said source of pressurized control fluid through said check valve and to prevent flow into said source of pressurized control fluid through said check valve.

33. The isolation system according to claim 25, wherein said accumulator is separate from the pilot valve and said outlet of said accumulator is connectable to the pilot valve by an isolation line.

34. A pressure relief system for a pressure vessel containing process media, said pressure relief system comprising:

a relief valve having an inlet in fluid-flow communication with the pressure vessel, an outlet, and a dome chamber;

a pilot valve having an inlet port, a control port in fluid-flow communication with the dome chamber, and a discharge port;

a cylinder having an interior chamber with an inlet in fluid-flow communication with said inlet of said relief valve and an outlet in fluid-flow communication with said inlet port of said pilot valve, and a piston located within said interior chamber into a first portion in fluid-flow communication with said interior chamber inlet and a second portion in fluid-flow communication with said interior chamber outlet, said piston preventing fluid-flow communication between said interior chamber inlet and said interior chamber outlet to isolate process media in said first portion from control fluid in said second portion, said piston being movable in response to fluid pressure in said first and second portions of said interior chamber to transmit pressure changes in process media in said first portion to control fluid in said second portion and to provide a 1:1 pressure transfer ratio from said first portion to said second portion;

a source of pressurized control fluid in fluid-flow communication with both said outlet of said cylinder interior chamber and said inlet port of said pilot valve;

a pressure regulator located between said source of pressurized control fluid and both said outlet of said accumulator and said inlet port of said pilot valve; and a check valve between said pressure regulator and both said outlet of said accumulator and said inlet port of said pilot valve, said check valve being oriented to allow flow out of said source of pressurized control fluid through said check valve.

* * * * *